June 23, 1936. J. R. WILSON 2,044,894
METHOD OF MAKING SHAPED ICE CREAM ARTICLES
Filed Oct. 13, 1933
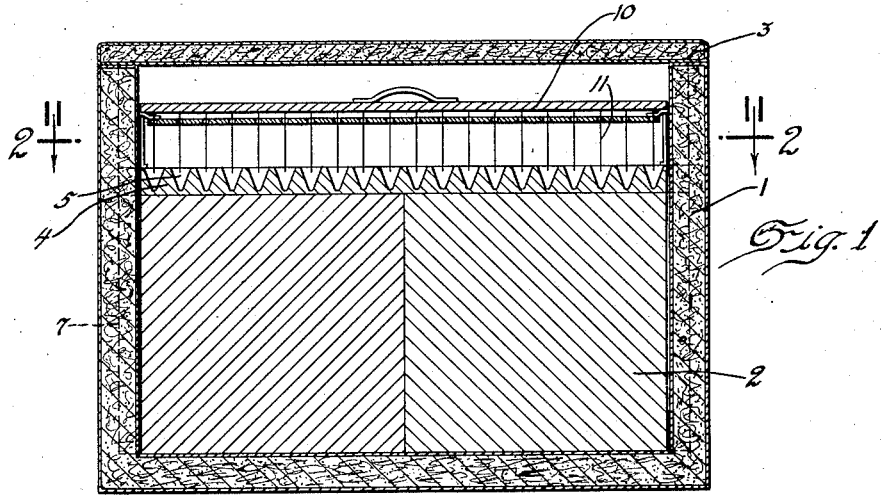
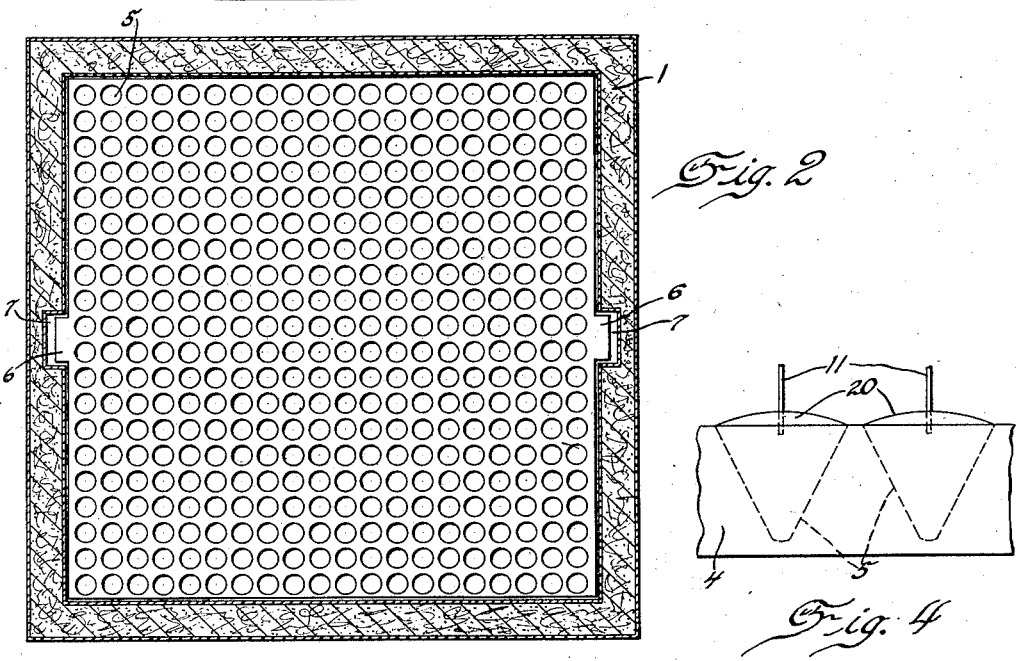
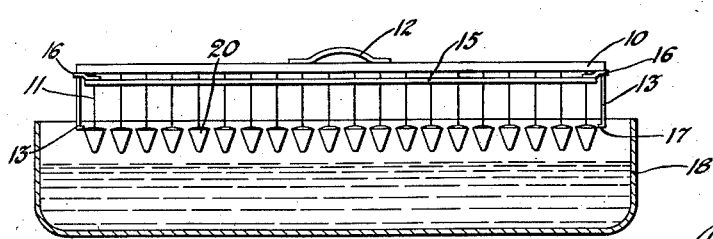
INVENTOR
Joseph R. Wilson
BY
Barnes, Kisselle & Laughlin
ATTORNEYS Patented June 23, 1936

2,044,894

UNITED STATES PATENT OFFICE 2,044,894

METHOD OF MAKING SHAPED ICE CREAM ARTICLES

Joseph R. Wilson, Ypsilanti, Mich., assignor to Margaret A. Wilson, Ypsilanti, Mich.

Application October 13, 1933, Serial No. 693,455

8 Claims. (Cl. 107—54)

This invention relates to a method of making individual articles or shapes of frozen food stuffs, and has to do particularly with the making of frozen shapes of ice cream or the like.

In order to more definitely advise relative to the articles to be made, it may be here stated that the invention contemplates a method of making articles of the type of several now generally widely distributed on the market such as, for example, blocks of ice cream covered with a layer of chocolate or other flavoring, or conical shapes of ice cream designed to be placed in a cone.

Much difficulty is experienced in the manufacturing of shaped articles of ice cream because of the ice cream adhering or sticking to the mold in which the same is formed. Usually a fairly soft ice cream or an ice cream mix is placed in molds and then subjected to a low temperature where the same is frozen quite hard, and then the same is removed from the molds. The cream, however, in its frozen form sticks tenaciously to the mold walls. It has even been the practice in some instances to invert the mold, apply a gas flame thereto in order to slightly melt the cream next adjacent the mold walls in order to release the same. Another practice involves the dipping of molds into water to heat them up enough to release the frozen article. These practices are time-consuming and involve some expense and add to the cost of manufacturing the articles. Moreover it has been thought in the industry that molds having thin walls should be used, the idea being that the thin walls better transferred the heat from the mold contents to the surrounding atmosphere.

This application is a continuation in part of application Serial No. 636,738, filed October 7, 1932.

I have discovered a process in the freezing of normally liquid or semi-liquid substance in molds to form shaped articles, in which there is practically no adherence of the formed body to the mold walls. The result is that the frozen shapes may be removed from the molds with little or no difficulty without requiring the employment of the inefficient procedure of heating the molds. One important feature of the process is to attain an extremely low temperature of the mold and frozen body therein. Another advantageous feature is the employment of molds having a considerable body of material such as metal which affords a reservoir, so to speak, of the cold. Of course, technically speaking, cold cannot be stored or reservoired since cold is merely the absence of heat, but with this explanation it is believed that any one skilled in the art, will know what is meant when it is stated that a reservoir of the cold is afforded. While employing such a mold with a considerable body of metal is advantageous it is not indispensable to the method.

Going further into the details of the method, reference may be had to the accompanying drawing illustrating an apparatus which may be used, although it is to be understood that the apparatus shown is of very simple form and is subject to much variation and elaboration.

Fig. 1 is a cross sectional view taken through a cabinet showing the mold in place therein.

Fig. 2 is a sectional view looking substantially on line 2—2 of Fig. 1.

Fig. 3 is a more or less diagrammatical view showing the dipping of the articles.

Fig. 4 is a diagrammatical view enlarged to show how the frozen ice cream expands.

An insulated cabinet is shown at 1 in which there may be placed one or more blocks of solid $CO_2$, illustrated at 2. Ordinarily these blocks are supplied in 10" cubes and, as shown, four of such blocks may be placed within the cabinet. The cabinet may have a removable cover 3. The mold is illustrated at 4 and it may have a multiplicity of cavities of any suitable shape, and as shown herein, the cavities as at 5, are of conical form. The mold may comprise one or more blocks of metal, and it will be observed that the block is fairly heavy providing a considerable body of metal around each cavity. This mold may be of aluminum, iron, steel or stainless steel, or other suitable material, and may be cast or machined as desired. In carrying out the invention relatively soft ice cream, or ice cream mix which is not frozen may be poured into the mold cavities and the mold then placed in the cabinet. Inasmuch as the mold sets upon the solid $CO_2$ it is prone to melt the cavity therein having the same shape and size as the mold, and for this reason the mold preferably has handles 6 which project beyond the edges of the solid $CO_2$ in order that the mold may be removed. The handles may be accommodated by grooves 7 in the cabinet. Preferably the mold has a dimension from one handled side to the other substantially equal to the dimension in the same direction as the solid $CO_2$.

After the substance has been placed in the mold, a device which may be termed a dipper may be placed into the cabinet. This may consist of a supporting member 10 carrying a multiplicity of tines 11, and the member may have a handle 12 and legs 13 which are designed to rest upon the mold. A stripper 15 in the form of a board or plate has apertures through which the tines extend, and this stripper is reciprocable on the tines but preferably is held from being detached. For this purpose the stripper may have lugs 16 for contacting with projecting portions or feet 17 of the legs 13. When the dipper is properly placed, each tine projects into a mold cavity, preferably substantially centrally thereof. The cover may now be placed over the cabinet and in the course of a few minutes the cream or mix is frozen to the desired degree. The frozen forms may now be removed. By grasping the handle 10 the multiplicity of frozen articles may be removed from the mold as each article clings to a tine 11. If the articles are to be coated they now may be dipped after the manner diagrammatically illustrated in Fig. 3 wherein the coating substance, which may be chocolate, is maintained in melted form in a vat 18. It will be noted that each article is held spaced from the next adjacent article so that the coating substance does not interconnect them. The stripper may, after the coating, be reciprocated to the tine ends thus to strip the formed articles from the tines. In freezing, the formed articles may expand and their upper surface may take a curved form, as illustrated in Fig. 4. The formed articles are illustrated at 20. This structure embodying the dipper and tines is merely one form of device which may be used in connection with the process.

The theory as to what takes place and causes the frozen articles to become freed from the mold walls has been the subject of considerable investigation and experimentation. The process has been carried out by using pre-cooled molds; in other words, the molds were removed from contact with solid $CO_2$ while at an abnormally low temperature and the liquid or semi-liquid substance placed in the mold cavities and then the filled molds replaced on the solid $CO_2$, or the molds may remain on the solid $CO_2$ without removal. This, if course, results in a very rapid freezing of the substance and it was found that the freezing took place much more rapidly with the heavy heat absorbing molds than with molds of light or thin walls. While the invention contemplates the use of molds of any desired shape it may be pointed out that molds of conical shape, or which are larger at the top than at the bottom, as a rule, facilitate the removal of the frozen forms therefrom, but the fact that the molds are this shape is not the reason why the frozen articles come out of the same, because even with conical shaped molds used according to the processes heretofore employed as mentioned above, the heating of the molds by a gas flame, water, or the like, is necessary. It has been found in carrying out the process with cone-shaped molds that the shaped articles may be removed therefrom easily whether the molds are extremely cold at the time the substance is placed therein, or whether the molds are warm, that is to say, somewhere around room temperature. The essential feature seems to be that of chilling the molds and the substance therein to a very abnormally low temperature as can be obtained by the use of solid $CO_2$.

Molds having straight sides have been employed. In the case of the heavy mold, that is, a mold comprising a block of metal with a mold cavity formed therein and having thick, heat absorbing walls, it is found that the frozen substance may be readily removed, when such molds are pre-cooled to an abnormally low temperature It is to be appreciated that when the substance freezes it expands, and then after it freezes it partakes of the characteristics of a solid and contracts as the temperature is decreased. In the case of a heavy pre-cooled mold, the metal of the mold is already contracted so that the cavity of the mold is contracted; when the liquid substance is placed therein and expands when it freezes, the heavy mold walls, it is believed, effectively resist this expansion to the end that the cavity remains in its small or contracted condition. Then after the substance is frozen and becomes a solid, the same contracts and becomes loosened from the mold walls; the amount of contraction of the frozen substance is greater than the contraction of the cavity since the cavity is already contracted at the time the substance was poured into the mold. Accordingly, it will be readily appreciated how the frozen substance contracts and can be easily removed from the cavity. In the case of light molds, or molds with thin walls, and having straight sides, the results were not so good in getting the material out of the mold. This may have been because the thin mold walls could not resist the expansion when the substance is freezing with the result that the mold walls were forced to expand and then, of course, contracted with the cooling of the frozen substance so that the frozen substance did not become loose. However, another phase of the matter is that it is practically impossible to form a mold with perfect surfaces in the cavity, with the result that the microscopic irregularities therein tied into the frozen substance. It therefore appears that with mold cavities, the surfaces of which are perfect, and which are not smaller at the upper portion than in the lower portion, that the process can be satisfactorily carried out, especially with a heavy block mold having sufficient strength to overcome the expansion of the freezing substance. Also, mold cavities with slightly inclining walls, with the taper sufficient to take care of imperfections in the mold walls, may be satisfactorily used. Where there is a considerable taper as in a cone-shaped mold, even the thin walled mold may be used because in this case it is believed that when the frozen substance expands in freezing, the substance, instead of forcing the mold walls outwardly, slides upwardly thereon as evidenced by a bulging or rounded crown on the top of the frozen substance.

It appears therefore that the general theory is that of causing the frozen substance to be chilled to such an abnormally low temperature that the contracting frozen substance becomes loose from the mold walls. Now in this connection it may be pointed out that various metals have been used for the molds; namely, aluminum, steel, Monel metal, and so-called german silver. At the same time the frozen substance sticks to the tines; this may be explained by the same theory in that as the substance contracts it tightens around the tines and adheres thereto.

In carrying out the invention it is believed to be preferred to use a mold block with considerable metal in it, so as to resist the expansion as the substance freezes, and also for absorbing the heat. This makes for very fast freezing action since the cold metal quickly absorbs the heat from the substance to be frozen and the articles may be frozen in a very short time—two or three minutes or so. It is also preferred to have the molds at an extremely low temperature at the time the substance is poured thereinto as this makes the freezing process more rapid. As will be found in the parent application, of which this application is a continuation in part, the original theory was that the abnormally low temperature molds caused such an immediate freezing that the substance did not have an opportunity to wet the walls of the mold and while it may be that this may facilitate the process in some respect yet it is now determined that it is not essential.

While the disclosure herein has been based largely upon a discussion of ice cream, the invention has a broader application in that it may be used in freezing other substances, particularly edible substances which are liquid or semi-liquid at normal temperatures, as for example, frozen pop, fruit juices, such as tomato juice, and the like. The use of the term "fluid" or "substantially fluid" herein and in some of the claims appended hereto is intended to mean a substance capable of being poured or of flowing, irrespective of whether it is a thick or thin fluid, at ordinary temperatures.

In order to ascertain critical temperatures or temperature ranges in the present method, a number of tests have been made using the so-called thermo-couple. Due to the fact that temperature conditions were changing so rapidly it has been quite difficult to ascertain these critical temperatures. However, the best information available at present is as follows: If a mix is place in a reasonably cold mold, that is a mold considerably below the freezing temperature of water, the frozen article becomes loose from the mold walls and can be removed therefrom when the temperature is lowered to about $-40°$ F. An average of several tests indicates that this is about the critical temperature under these circumstances. If, however, a mold is used which is above freezing or about room temperature, the temperature of the mold has to be lowered to about $-50°$ F. in order for the frozen substance to become loose from the walls to be removed therefrom; it seems that this is because the mold cavity is enlarged by expansion at the time it is filled, and the same contracts considerably with the lowering of the temperature, thus requiring more temperature reduction than where the mold is reasonably cold to start with. It also appears that if the mold is maintained at about or below $-40°$ F. that the frozen shape will become loose from the walls after a requisite lapse of time, without further temperature reduction. It is preferred, however, that the process be carried out under conditions where the mold is maintained at a very low temperature, say about $-80°$ F. or lower, as this materially increases the freezing rate and shortens the time between the filling of a mold and when the frozen shapes may be removed therefrom.

I claim:

1. The method which comprises, filling the cavity of a mold with a substantially fluid substance while maintaining the mold at a temperature of $-40°$ F. or lower, whereby the same freezes into a solid, retaining the frozen substance in the cavity while maintaining the mold at said temperature until the same becomes loose from the mold walls, and then removing the frozen substance from the mold cavity while the mold is held substantially at said temperature.

2. The method which comprises, maintaining a mold with a cavity therein at a temperature of about $-80°$ F. or lower, filling the cavity with a substantially fluid substance whereby the same freezes, retaining the frozen substance in the cavity while maintaining the mold substantially at said temperature until the frozen form becomes loose from the walls of the cavity, and then removing the frozen substance from the mold cavity while the mold is substantially at said temperature.

3. The method which comprises, filling the cavity of a mold with a substantially fluid substance while the mold is at a temperature which is below the freezing temperature of the substance and above $-30°$ F., allowing the substance to freeze in the cavity, then lowering the temperature of the mold to about $-40°$ F. or lower to cause the frozen substance to become loose from the cavity walls whereby the same may be readily removed therefrom while the mold is at a temperature of about $-40°$ F. or lower.

4. The method which comprises, filling the cavity of a mold with a substantially fluid substance while the temperature in the mold is above the freezing temperature of said substance, then lowering the temperature of the mold to about $-50°$ F. or lower to cause the frozen substance to become loose from the mold walls, whereby the same may be readily removed from the mold while the same is at about $-50°$ F. or lower.

5. The method which comprises, filling the cavity of a substantially rigid mold with a substantially fluid substance, freezing the substance, attaining a temperature of the mold of about $-40°$ F. or lower, with the frozen substance in the mold cavity, retaining the frozen substance in the mold at such temperature until the frozen substance becomes loose from the mold walls, whereby the same may be readily removed therefrom, and then removing the frozen substance from the mold.

6. The method of molding ice cream and the like which consists in providing a metallic mold, cooling said mold to a temperature below minus 20° F., pouring ice cream into said cooled mold, continuing to cool said mold to the point where said ice cream is sufficiently solidified and contracted that it may be removed as a unit from said mold without heating said mold, and then removing said ice cream as a unit from said mold.

7. The method of molding ice cream and the like which consists in providing a metallic mold, cooling said mold to a temperature below minus 50° F., pouring ice cream into said mold, and refrigerating said mold to substantially maintain it at the aforesaid temperature until said ice cream is sufficiently solidified and contracted that it may be readily removed as a unit from said mold without heating said mold, and then removing said ice cream as a unit from said mold without heating the latter.

8. The method of molding ice cream and the like which consists in providing a metallic mold, maintaining a refrigerant against said mold which has a temperature below minus 20° F., pouring ice cream into said mold, allowing said ice cream to remain adjacent said mold for a relatively brief interval until said ice cream is sufficiently solidified and contracted that it may be removed as a unit from said mold without heating said mold, removing said ice cream as a unit from said mold, repeating said process by again pouring ice cream into the aforesaid cold and empty mold, and allowing said ice cream to remain for a relatively brief interval in said mold, and removing the last mentioned ice cream as aforesaid, said refrigerant remaining in contact with said mold throughout the operation of said process.

JOSEPH R. WILSON.